Dec. 18, 1956     W. E. LEIBING     2,774,261

CONTROL MECHANISM FOR DRILL PRESSES

Filed April 20, 1956

INVENTOR.
WILLIAM E. LEIBING
BY
M. A. Hobbs

United States Patent Office 2,774,261
Patented Dec. 18, 1956

2,774,261

CONTROL MECHANISM FOR DRILL PRESSES

William E. Leibing, Pasadena, Calif.

Application April 20, 1956, Serial No. 579,536

3 Claims. (Cl. 77—55)

The present invention relates to drill equipment and more particularly to a mechanism for controlling the operation of drilling equipment.

In automatic drilling equipment the drilling is usually accomplished in two or more steps of a preselected cycle. In the first step the drill is advanced to cutting position, in the second the boring is accomplished in two or more strokes wherein the drill is advanced at a predetermined cutting speed, withdrawn to permit it to free itself of the chips and again advanced to its proper depth, and in the third step the drill is withdrawn and returned to its initial starting position. The drill presses now available are not equipped to sense the cutting condition of the drill or the machining characteristics of the metal, both of which may change during a particular drilling operation or from one drilling operation to another.

It is therefore one of the principal objects of the present invention to provide a device which can readily be installed on conventional automatic drilling equipment and which can be set to interrupt the drilling operation whenever the torque on the drill reaches a predetermined point.

Another object of the invention is to provide a mechanism for use with drilling equipment which functions to interrupt the operation of said equipment when the torque on the drill approaches the breaking point of the drill.

Another object of the invention is to provide a torque switch adapted to be mounted on a drill press spindle, which will interrupt the drilling cycle and cause the drill to withdraw from its cutting position to its initial starting position, in the event torque on the drill reaches a predetermined point.

Still another object of the invention is to provide a means for use in conjunction with a drill press which signals to the press operator that a condition exists at the drill which may break the drill or otherwise damage the drilling equipment.

A further object of the invention is to provide a mechanism for use on a drill press which will cause the drill to withdraw from the bore to free the drill of chips whenever the flutes on the drill are becoming choked to the extent that excessive torque is required to maintain the desired drill speed.

Other advantages of my invention will occur to those skilled in the art from the following detailed description of a mechanism embodying the invention. In the drawing.

Figure 1:
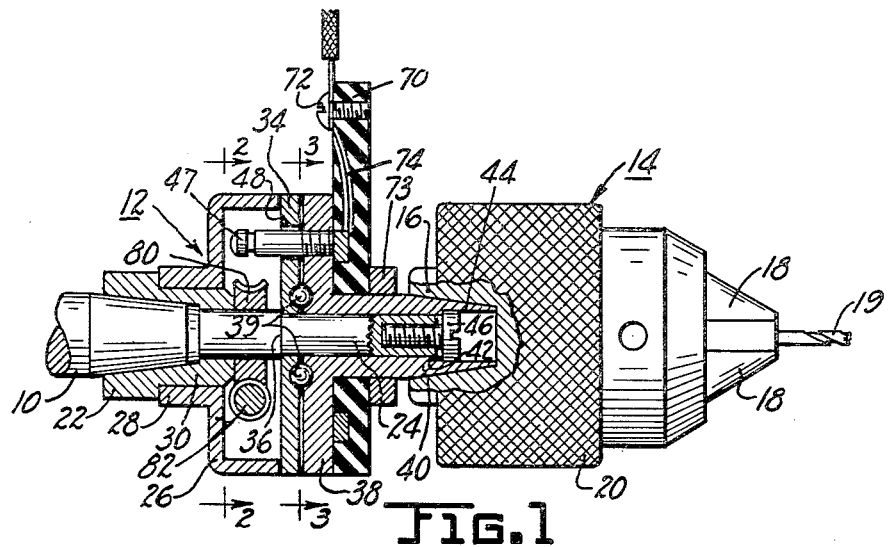
Figure 1 is a longitudinal cross sectional view through my drill press control mechanism, showing said mechanism mounted on the end of the drill press spindle and having mounted on the other end a standard drill chuck.

In Figure 1, numeral 10 indicates the end of a drill press spindle, numeral 12 indicates my control unit or mechanism mounted on the end of spindle 10, and numeral 14 a standard or conventional drill chuck operatively connected to unit 12. For the purpose of illustrating the present invention, the drill press of which spindle 10 is an operating part may be considered as a conventional automatic drilling press having a pneumatic feed with electrically actuated control valves. In this type of drill press the operator merely pushes an electric button to start the automatic feeding of the drill after it has been located correctly relative to the work. When the operator pushes the button, a solenoid switch is operated to cause air to be admitted into a pneumatic cylinder for quickly feeding the drill head down to the work. Drilling is accomplished in two strokes of the drill spindle, the drill being withdrawn from the hole when it is about half way through, to permit it to free itself of chips. Then at the end of the second drilling step, the drill head is quickly withdrawn from the work to its initial starting position. The foregoing steps are set and controlled by a preselected cycle and are performed without regard to the condition of the drill or machining characteristics of the metal in each work load.

While a number of different types of chuck 14 may be used in conjunction with my mechanism to perform the desired drilling operation, the one shown may be considered a standard and well known "Jacobs" chuck consisting of a body 16 having a tapered axial bore for receiving the end of the drill press spindle or in this instance a corresponding part of my control mechanism, jaws 18 supported by said body 16 for gripping a drill 19, and a sleeve 20 around said body adapted to rotate in either direction to open and close jaws 18.

My control unit 12 is connected to spindle 10 by a sleeve 22 which has an axial hole therein tapered inwardly to match the taper on the end of the spindle and which grips said tapered end and hold the unit firmly in operative position on the spindle. A shaft 24 extending through most of the unit is attached to and in axial alignment with the inner end of the sleeve 22 and is adapted to rotate in unison therewith. Mounted on sleeve 22 is a cup-shaped shell 26 which rotates with sleeve 22 during normal operation of the drill and rotates relative to the sleeve when the unit is being adjusted to respond to preselected torque on the drill. The open end of shell 26 is closed by a disc-shaped plate 34 fixedly mounted on shaft 24 and seated against an annular shoulder 36 so positioned on shaft 24 that only a small space is provided between the edge of the open end of shell 24 and the adjacent face of plate 34. A second plate 38 is mounted on shaft 24 and is separated from plate 34 by ball bearings 39. During normal operation of the drill, both plates rotate in unison with shaft 24, shell 26, sleeve 22 and spindle 10, but during the time unit 12 is operative plate 38 moves relative to plate 34, as will be more fully explained hereinafter. Plate 38 has a shaft-like hollow extension 40 on the side opposite plate 34, terminating in an end portion having side walls tapered to correspond to the normal taper of the standard spindle to receive the drill chuck, as shown in Figure 1. Shaft 24 extends through the center of extension 40 to a point just short of an internal annular shoulder 42 and is provided with a threaded axial hole in the end thereof. A screw 46 having a head for engaging and seating on shoulder 42 is threaded into said hole 44 and, when tightened in the hole, draws plate 38, bearings 39 and plate 34 together and seats plate 34 firmly against shoulder 36. A post 47 is seated in plate 38 and extends through an arcuate slot 48 into shell 26 where a spring 49 attached to the free end of said post and to a fixture 50 in the side wall of the shell urges the post in a clockwise direction until it contacts the end of slot 48. By the structure described thus far the driving force for the drill is transmitted from spindle 10 through unit 12 to the drill chuck.

Figure 5:
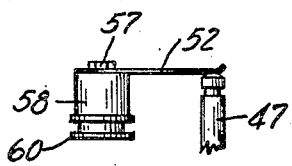
Figure 5 is a fragmentary view of electrical contacts forming a part of my control unit.

My mechanism includes an electrical switch which is adapted to close when the torque transmitted to the drill reaches a preselected value. This switch consists of a terminal 51 having a leaf spring contact 52, and post contact 47, which under certain drill operating conditions slides against the leaf spring contact and closes the circuit, as shown in Figure 5. The leaf spring contact 52 is attached to terminal 51 by a post 56 and a nut 57 threaded onto said post, said post extending through metal washer 58 and a nonconducting washer 60, and terminating in an enlarged head 62. Post 56 is connected into the drill press control circuit by a pin 64 seated in a recess in head 62 and an electrical conducting slip ring 68 seated in a nonconducting fibrous block 70 and connected to a terminal 72 by a lead 74. Block 70 is mounted on extension 40 and held in place thereon by collar 73 fitted snugly on said extension. The block does not rotate with unit 12 but permits extension 40 to rotate freely in the hole through the center of the block. To permit terminal 51 to make contact at all positions of plate 34 relative to plate 38 an arcuate slot 76 is provided in the latter plate for the head 62 of post 56 to move in as the two plates rotate relative to one another.

Figure 2:
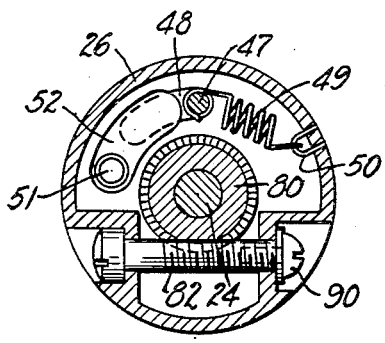
Figure 2 is a cross sectional view of my mechanism taken on line 2—2 of Figure 1.
Figure 3:
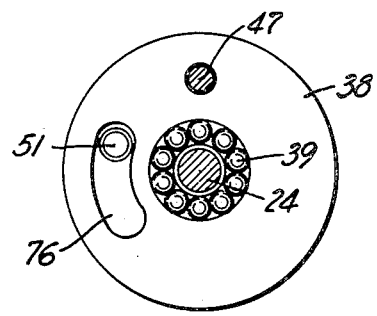
Figure 3 is a cross sectional view of the mechanism taken on line 3—3 of Figure 1.
Figure 4:
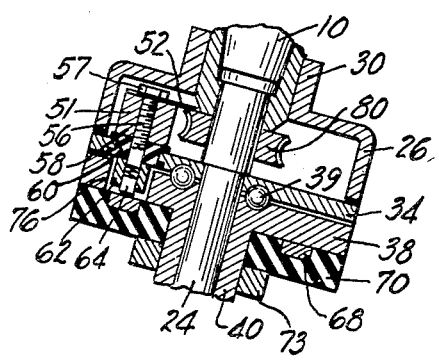
Figure 4 is a longitudinal cross sectional view of my mechanism, taken at a different point than the view of Figure 1.

The amount of torque on the drill required to close the electrical switch is determined by the amount of tension on spring 49. This tension is adjusted by rotating shell 26 in a clockwise direction while post 47 is against the right hand end of slot 48, as seen in Figure 2. Rotation of shell 26 is accomplished by a mechanism consisting of the gear 80 fixedly mounted on shaft 24 and a worm 82 journalled in the side walls of the shell. Rotation of the worm in one direction rotates the shell in the direction to increase the tension on the spring and rotation in the opposite direction rotates the shell to decrease the spring tension. During the rotation of the shell plate 34 which is secured to shaft 24 remains stationary and hence post 47 is held stationary by the end of slot 48 in said plate. Movement of fixture 50 relative to post 47 as the shell is rotated changes the tension on the spring. To assist in making accurate adjustments of the tension on the spring, a zero mark is placed on either the outside periphery of shell 26 or on the edge of plate 34 and a scale is placed on the other of said member, so that the degree of relative rotation between the two members can be readily ascertained. After an adjustment has been made worm 82 is locked in place by tightening screw 90 in the end of the worm.

In the operation of the drilling equipment just described, when the drill is operating normally under the torque limit set on my control unit, post 47 is held by spring 49 against the right hand end of slot 48 (as viewed in Figure 2), and consequently spindle 10, shell 26, plate 38, extension 40 and chuck 14 all rotate in unison and the drill press operates as if my unit were not mounted thereon. In the event the drill encounters a hard spot in the metal or the drill becomes dull or fails to properly free itself of chips, the torque on the drill immediately increases. If the torque reaches the torque limit selected on unit 12, which limit is substantially under the breaking point of the drill, spring 49 no longer holds post 47 against the right hand end of slot 48 and plate 34 with leaf spring contact 52 rotates clockwise relative to plate 38 on which post 47 is seated, causing said post to engage contact 52 and thus complete the electrical circuit for interrupting the drilling operation. As soon as the drill frees itself from the bore in the work, spring 49 disengages post 47 from contact 52 and immediately returns said post to its initial position at the right hand end of slot 48. Depending upon the type of automatic control employed on the drill press, the drill either returns to its initial starting position and remains there until the operator again starts the press, or it is again advanced to its cutting position. If the latter type of operation is employed and the drill is automatically returned to its cutting position while the condition which caused the excessive torque on the drill is still present, the switch of unit 12 will again close and interrupt the drilling operation. Thereafter, the drill will repeatedly be advanced and withdrawn until the condition causing the difficulty has been corrected or the press stopped. The repeated advancing and withdrawing of the drill functions as a signal to the drill press operator that something is wrong in the drill operation.

If an increase or a decrease on the torque limit as controlled by my unit is desired, the operator merely loosens screw 90 and turns worm 82 to rotate shell 26 relative to plate 34. The rotation of the shell shifts fixture 50 toward or from post 47 as said post is held against the right hand end of slot 48 (as seen in Figure 2) and thereby decreases or increases the tension on spring 49 to suit the requirements. When the adjustment has been made, screw 90 is tightened to retain worm 82 and hence shell 26 in its newly adjusted position.

Although only one embodiment has been described in detail herein, various modifications and changes can be made without departing from the scope of the present invention.

I claim:

1. A torque switch for a drill press or the like having a spindle, comprising a shaft adapted to be operatively connected to the spindle and to rotate in unison therewith, a second shaft axially aligned with said first mentioned shaft and capable of rotating relative thereto for receiving a chuck, a disc-shaped member joined to said first mentioned shaft for rotation therewith and having an arcuate slot therein forming an abutment, a disc-shaped member joined to said second mentioned shaft for rotation therewith, a post seated in said second mentioned disc-shaped member and extending through said slot, a cup-shaped shell around said first mentioned shaft and joined thereto, a spring connected at one end to said post and at the other end to said shell for urging said post against said abutment, an electrical contact mounted on said first mentioned disc-shaped member and adapted to make electrical contact with said post when said shafts rotate relative to one another, an electrical non-conducting, nonrotating plate around said second mentioned shaft, an electrical conducting ring on said plate connected to a terminal on said plate and a means connecting said contact to said ring, and a means for adjusting the tension on said spring including a gear secured to said first mentioned shaft and a worm on said shell for rotating said shell relative to said first mentioned member, thereby to vary the amount of torque on the drill required to cause said second mentioned shaft to rotate relative to said first mentioned shaft.

2. A torque switch for a drill press or the like having a spindle, comprising a shaft adapted to be operatively connected to the spindle and to rotate in unison therewith, a second shaft axially aligned with said first mentioned shaft and capable of rotating relative thereto for receiving a chuck, a disc-shaped member joined to said first mentioned shaft for rotation therewith and having an arcuate slot therein forming an abutment, a disc-shaped member joined to said second mentioned shaft for rotation therewith, a post seated in said second mentioned member and extending through said slot, a shell around said first mentioned shaft and joined thereto, a spring connected at one end to said post and at the other end to said shell for urging said post against said abutment, a means for adjusting the tension on said spring, an electrical contact mounted on said first mentioned disc-shaped member and adapted to make electrical contact with said post when said shafts rotate relative to one another, an electrical conducting ring in axial alignment with said shafts and connected to a terminal, and a means connecting said contact to said ring.

3. A torque switch for a drill press or the like having a spindle, comprising a shaft adapted to be operatively connected to a spindle and to rotate in unison therewith, a second shaft axially aligned with said first mentioned shaft and capable of rotating relative thereto for receiving a chuck, a disc-shaped member joined to said first mentioned shaft for rotation therewith and having an arcuate slot therein forming an abutment, a disc-shaped member joined to said second mentioned shaft for rotation therewith, a post seated in said second mentioned member and extending through said slot, a shell around said first mentioned shaft and joined thereto, a spring connected at one end to said post and at the other end to said shell for urging said post against said abutment, and an electrical contact mounted on said first mentioned disc-shaped member and adapted to make electrical contact with said post when said shafts rotate relative to one another, thereby to close a circuit for interrupting the drilling operation.

References Cited in the file of this patent

UNITED STATES PATENTS

| | | |
|---|---|---|
| 2,281,432 | Grohn | Apr. 28, 1942 |
| 2,364,318 | Schauer | Dec. 5, 1944 |
| 2,659,469 | Unk | Nov. 17, 1953 |